United States Patent
Phan

(10) Patent No.: US 11,267,948 B2
(45) Date of Patent: Mar. 8, 2022

(54) SYSTEM AND METHOD FOR MAKING SYNTHETIC BUILDING MATERIALS USING PLASTIC WASTE COMBINED WITH INDUSTRIAL AND AGRICULTURAL SCRAP

(71) Applicant: Hoan Trong Phan, Ho Chi Minh (VN)

(72) Inventor: Hoan Trong Phan, Ho Chi Minh (VN)

(73) Assignees: Bich Thuy Thi Tran, Ho Chi Minh (VN); Hoan Trong Phan, Ho Chi Minh (VN)

( * ) Notice: Subject to any disclaimer, the term of this patent is extended or adjusted under 35 U.S.C. 154(b) by 0 days.

(21) Appl. No.: 17/248,680

(22) Filed: Feb. 3, 2021

(65) Prior Publication Data

US 2022/0002514 A1    Jan. 6, 2022

(51) Int. Cl.
*C08J 11/06* (2006.01)
*B29B 7/60* (2006.01)
(Continued)

(52) U.S. Cl.
CPC ............... *C08J 11/06* (2013.01); *B29B 7/50* (2013.01); *B29B 7/58* (2013.01); *B29B 7/60* (2013.01);
(Continued)

(58) Field of Classification Search
CPC .............. B29K 2105/26; B65G 65/489; B65G 65/4872
See application file for complete search history.

(56) References Cited

U.S. PATENT DOCUMENTS

| 4,038,021 A | * | 7/1977 | Benson | F26B 3/205 |
| | | | | 432/112 |
| 4,390,375 A | * | 6/1983 | Rugg | C13K 1/02 |
| | | | | 127/1 |

(Continued)

FOREIGN PATENT DOCUMENTS

WO    WO-2011135388 A2 * 11/2011 .............. C08J 11/06

OTHER PUBLICATIONS

Arifin, Amir, and Abu Bakar Sulong. "Effect of Mixing Parameters on the Mixing Time and Density of Composite Ha/ti6al4v Feedstock for Powder Injection Molding." MATEC Web of Conferences, vol. 101, 2017, p. 03003., doi:10.1051/matecconf/201710103003. (Year: 2017).*

(Continued)

*Primary Examiner* — Kelly M Gambetta
*Assistant Examiner* — Andrés E. Behrens, Jr.

(57) ABSTRACT

The invention to provide a system of equipment for making synthetic building materials using plastic wastes combined with industrial and agricultural scrap includes: sorting and cleaning equipment, grinding equipment, powder grinding equipment, mixing equipment, pelletizing equipment, drying equipment, hot stir equipment, shaping equipment are connected together by mechanical connectors. The database connected to the controller controls the sorting and cleaning equipment, the grinding equipment, the powder grinding equipment, the mixing equipment, the pelletizing equipment, the drying equipment, the hot stir equipment, and the shaping equipment through transmission channels. In addition, the present invention provides a method of manufacturing for making synthetic building materials using plastic wastes combined with industrial and agricultural scrap.

1 Claim, 3 Drawing Sheets

(51) Int. Cl.
    *B29B 7/82*     (2006.01)
    *B29B 7/72*     (2006.01)
    *B29B 7/58*     (2006.01)
    *B29B 7/84*     (2006.01)
    *B29B 7/50*     (2006.01)
    *B29B 9/12*     (2006.01)
    *B29C 70/00*     (2006.01)
    *C08J 11/00*     (2006.01)
    *C08J 11/04*     (2006.01)
    *B29B 7/00*     (2006.01)
    *B65G 65/46*     (2006.01)
    *B65G 65/48*     (2006.01)
    *C13K 1/02*     (2006.01)
    *C08K 11/00*     (2006.01)
    *B29K 101/12*     (2006.01)
    *B29K 511/00*     (2006.01)
    *B29K 105/26*     (2006.01)
    *B29L 31/10*     (2006.01)
    *B29L 31/00*     (2006.01)

(52) U.S. Cl.
CPC .............. *B29B 7/72* (2013.01); *B29B 7/82* (2013.01); *B29B 7/84* (2013.01); *B29B 9/12* (2013.01); *B29C 70/00* (2013.01); *B29K 2101/12* (2013.01); *B29K 2105/26* (2013.01); *B29K 2511/00* (2013.01); *B29L 2031/10* (2013.01); *B29L 2031/102* (2013.01); *B29L 2031/104* (2013.01); *B29L 2031/108* (2013.01); *B29L 2031/776* (2013.01); *C08J 2323/06* (2013.01); *C08J 2323/12* (2013.01); *C08J 2325/06* (2013.01); *C08J 2367/02* (2013.01); *C08J 2423/06* (2013.01); *C08J 2423/12* (2013.01); *C08J 2425/06* (2013.01); *C08K 11/005* (2013.01)

(56) References Cited

U.S. PATENT DOCUMENTS

| | | | | |
|---|---|---|---|---|
| 5,591,496 | A * | 1/1997 | Anderson | B32B 27/32 428/36.5 |
| 6,423,254 | B1 * | 7/2002 | Bertoglio | B29B 17/0042 264/45.1 |
| 8,202,918 | B2 * | 6/2012 | Azulay | B29B 17/0042 521/45.5 |
| 9,005,402 | B2 * | 4/2015 | Del Monte | B01J 8/087 201/32 |
| 10,501,945 | B2 * | 12/2019 | Cernohous | C08K 3/36 |
| 2008/0116304 | A1 * | 5/2008 | Kim | B02C 21/00 241/24.1 |
| 2010/0028089 | A1 * | 2/2010 | Burke | B65G 33/18 406/53 |

OTHER PUBLICATIONS

Thomas, Michael. Edible Water Plants: Aquatic Vegetables, Jul. 2008, natures-water.com/education_information/edible_plants/. (Year: 2008).*

* cited by examiner

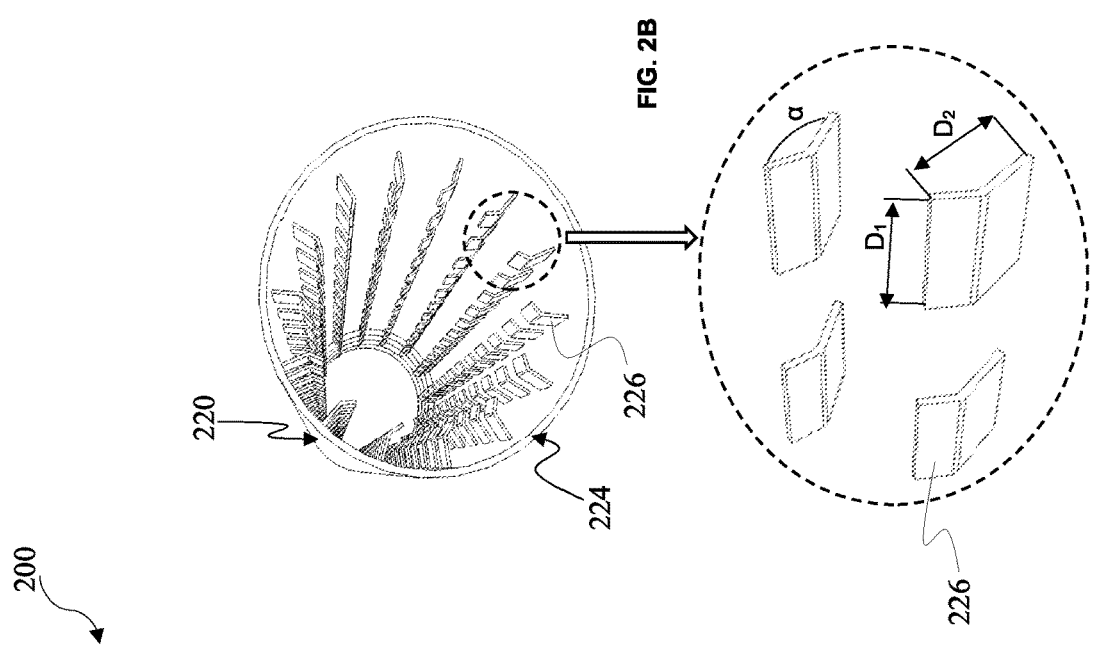
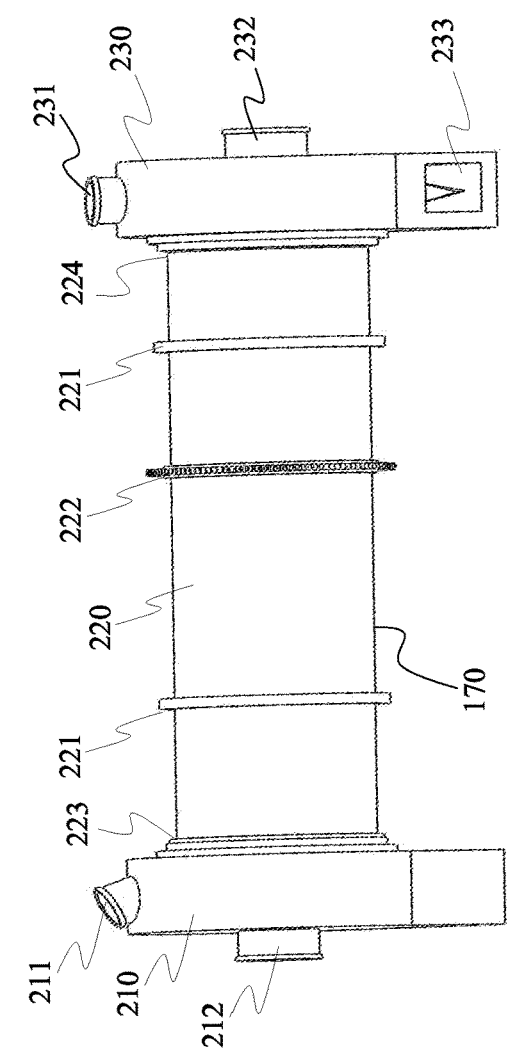
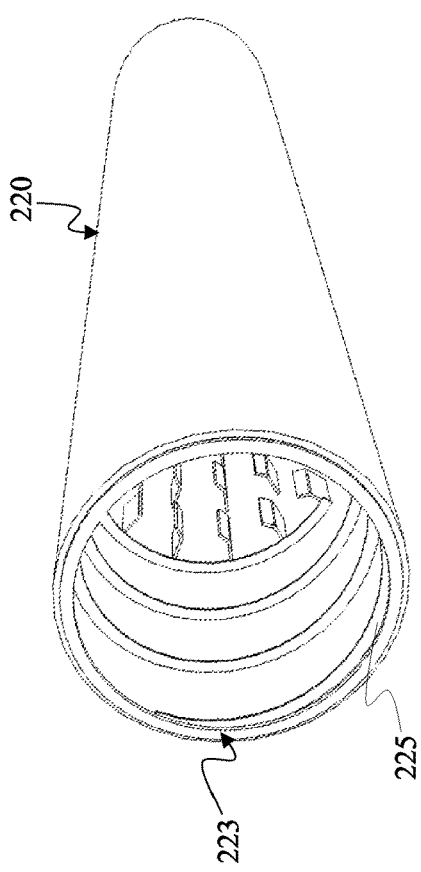
FIG. 2A
FIG. 2B
FIG. 2C

SYSTEM AND METHOD FOR MAKING SYNTHETIC BUILDING MATERIALS USING PLASTIC WASTE COMBINED WITH INDUSTRIAL AND AGRICULTURAL SCRAP

FIELD OF THE INVENTION

The invention relates to waste treatment technology and material technology. In particular, the invention refers to a system and method making synthetic building materials using plastic waste combined with industrial and agricultural scraps. It helps to generate new building materials, reduce environmental pollution.

BACKGROUND ART

According to Ocean Conservation Association statistics in 2017, Vietnam is one of the top five countries responsible for about 13 million tons of plastic released into the ocean in a year. Vietnam Clean and Green's statistics shows that Vietnam is one of the top 5 countries to discharge plastic waste with about 1.8 million tons to the environment every year, of which about 730 thousand tons of plastic waste is dumped into the sea.

Plastic waste comes from different sources, mainly from household waste such as plastic bags, plastic bottles, plastic straws; plastic waste from manufacturing activities from factories and industrial parks; plastic waste from tourism activities such as plastic cups, straws, bottles; medical plastic waste generated such as needles, gloves, medicine bottles. It can be said that the situation of production, consumption and plastic waste is increasing constantly, without timely treatment, the environment will be seriously damaged from plastic waste.

Good plastic waste is collected for recycling, while bad plastic waste is mixed with household waste to bury that will affect the environment in the long run. Therefore, it is necessary to find a way to reuse these bad plastic waste.

In addition, there are many other types of scrap from agriculture and industry sectors. Specifically, scrap is discharged from industries such as solid waste, rags, shoes; coal slag and fly ash from thermal power plants; red mud, sludge from sand and ore exploitation activities; scrap from agricultural activities such as corn cobs, corn stalks, coffee hulls, cashew husks, bagasse, rice husks, banana stalks, dragon fruits, etc. . . . The use of this scrap contributes to solve environmental pollution, also the advantage of scrap is to increase income for workers.

It is necessary to take measures to treat environmental pollution from plastic waste and waste from agricultural and industrial sectors. One of the options to solve the above problem is to use the above-mentioned wastes as building materials.

The building materials are used very commonly in housing constructions and other constructions. The current technology of producing building materials has to use a lot of natural resources such as wood, sand, stone, etc., causing the situation of increasingly exhausting resources. Additionally, the exploitation of these raw materials causes vandalism and environmental pollution. At the same time, the production of building materials from the above materials also causes serious environmental pollution. At present, many factories producing building materials have not fully solved the problem of environmental pollution from their production activities, and have not taken advantage of available inexpensive materials.

The use of plastic wastes and industrial/agricultural scrap into the production of building materials has not been popularized and has not taken full advantage of this source of materials. Moreover, the hot stir equipment and heating equipment at the mixed processing stage to create composite materials is only achieved to a limited extent. Specifically, only one type of recycled plastic is mixed with a few scrap, which limits the productivity and waste treatment. Therefore, it is necessary to have proper equipment and methods to use plastic waste and scrap as building materials.

Patent application WO2012009005 discloses a method of producing composites from industrial or residential sludge and plastic waste, in which the plastic waste used is high density polyethylene (HDPE) and/or polypropylene (PP). The production method includes the following steps: (1) batching dried sewer sludge and the recycled plastic in appropriate small cut pieces to form a mixture; (2) heating to liquefy the mixture; (3) feeding into a compression mold to create specific structures.

Patent application KR1017511970000 discloses an apparatus and a method for manufacturing a composite material using recycled polyethylene terephthalate (PET) and volcanic ash, and more specifically, to an apparatus and a method for manufacturing a composite material using the recycled PET and volcanic ash, which are capable of manufacturing a noble composite material that is hardly affected by ultraviolet rays and has excellent adhesive strength and elasticity by using the recycled PET. The apparatus according to the present invention comprises: a material injection hopper into which mixed materials obtained by mixing 70 wt % of nylon-containing recycled PET, 20 wt % of waste aramid resin, and 10 wt % of volcanic ash including granules having a diameter of 4 mm with respect to sizes and shapes thereof are injected, and a carbon fiber, a glass fiber and acrylonitrile butadiene styrene are additionally injected; a dehumidifier which passes the materials injected into the material injection hopper through a drying process of 10 to 12 hours to remove moisture included in the materials; an extruder including an injection hopper into which the moisture-removed materials are injected, a screw which mixes the materials injected through the injection hopper, and a heater which applies heat to the materials to melt the materials when the materials are mixed by the screw, the heater providing adhesive property as the nylon and the waste aramid resin included in the PET are being mixed with each other while the materials are being molten by the heater, the volcanic ash adjusting the viscosity of the materials to produce the PET composite material, and the extruder manufacturing the PET composite material by extruding the PET composite material into a long bar shape through a discharge hole that discharges the PET composite material while extruding the produced PET composite material; a cooling unit which contacts cooling water with the PET composite material discharged from the extruder to harden the PET composite material by cooling; a compound machine which cuts the hardened PET composite material discharged from the cooling unit to a predetermined length; a carrier which carries the PET composite material using a conveyor belt; and a composite material reservoir which stores the PET composite material carried through the carrier.

Patent application KR1017511970000 discloses a preparation method of a paper-plastic composite material from recycled paper-plastic materials. The technical scheme is as follows: the method comprises the following steps: waste paper-plastic material pretreatment, paper-plastic material pulverization, raw material mixing, granulation, extrusion forming and the like, thereby obtaining the HDPE (high-density polyethylene)-base paper-plastic composite material. The method can prepare high-dispersity granules suitable for continuous industrial production from recycled paper-plastic materials, greatly improves the complex process of the waste paper-plastic material recycling procedures, reduces the energy consumption, enhances the added value of the recycled paper-plastic materials, and has important meanings for relieving environmental pollution.

It can be seen that the above technical solutions meet the purpose and requirements set out. However, all three inventions use only one type of plastic combined with one blending material to put into production without the combination of many types of plastic waste and different types of mixing materials to create synthetic building materials, and manufacturing methods do not bring high efficiency.

Therefore, it is necessary to find better ways to make use of plastic waste and industrial, agricultural wastes without affecting the environment, increase economic efficiency.

It is also necessary to produce a synthetic building material that replaces traditional building materials, reduces production costs and brings high efficiency.

It is also needed a synthetic building material manufacturing system that requires a hot stir equipment to handle different types of primary and/or recycled plastics at the same time to form a composite of materials that is used for many different types of products.

This invention provides solutions that achieve the above purposes.

SUMMARY OF THE INVENTION

The main purpose of the invention is to provide a system of equipment for making synthetic building materials using plastic wastes combined with industrial and agricultural scrap includes: sorting and cleaning equipment, grinding equipment, powder grinding equipment, mixing equipment, pelletizing equipment, drying equipment, hot stir equipment, shaping equipment, power source, controller and a database system.

Particularly, the sorting and cleaning equipment, the grinding equipment, the powder grinding equipment, the mixing equipment, the pelletizing equipment, the drying equipment, the hot stir equipment, the shaping equipment are connected together by mechanical connectors; the drying equipment and the hot stir equipment are mechanically connected together to create a circulated hot air.

The hot stir equipment includes material input, shaft and material output; one shaft end is mechanically connected to the material input, the other end is mechanically connected to the material output; the material input provides material and hot air into the shaft; the material output carries material and hot air after being heated; the shaft is where the heating process is performed; the material input including a feed hopper and a hot air input placed in contact with the shaft; the material output including a steam vent, a hot air output and a material receiver placed in contact with the shaft; the shaft is cylindrical in shape, the shaft input is mechanically connected to the material input; the shaft output is mechanically connected to the material output; power-assisted rollers and pinion wheels circumferentially running along the outer diameter of the shaft; spiral groove and mixing blades are disposed inner diameter of the shaft; the pinion wheels receive transmission to rotate the shaft; the spiral groove installed at the input of the shaft, running along the inner circumference of the shaft and facing the mixing blades to receive material from the input and transport to the mixing blades; each of the mixing blades is rectangular in shape from 450 mm to 800 mm in length, 300 mm to 500 mm in width and one end bent at an angle of 15° to 20° and attached equidistant from the inside circumference of the shaft and distributed along the length of the shaft from the position in contact with spiral groove to the shaft output;

The database connected to the controller controls the sorting and cleaning equipment, the grinding equipment, the powder grinding equipment, the mixing equipment, the pelletizing equipment, the drying equipment, the hot stir equipment, and the shaping equipment through transmission channels.

The system of equipment for making synthetic building materials according to claim 1, wherein the transmission channel includes wired transmission channel consisting of RS485, RS323, RSJ45; and wireless transmission channel consisting of WIFI, Bluetooth, BLE, ZigBee, Z-ware, RF, optical.

The system of equipment for making synthetic building materials according to claim 1, wherein the controller consisting of a programmable logic controller (PLC), a supervisory control and data acquisition (SCADA).

The other purpose of the invention is to provide a method for making synthetic building materials using plastic wastes combined with industrial and agricultural scrap including the following steps:

i) Scrap treatment: scraps from agricultural, industrial production and processing and natural scraps are collected, sorted and processed, to obtain scrap powders with a predetermined moisture percentage of less than 14%. Wherein, scraps from agricultural production and processing activities including corn cobs, corn stalks, coffee pods, cashew shells, bagasse, rice husks, banana stalks, plants and sunflower seeds, coconut trees, coconut shells, dragon fruit trees, rice stalks, barley stalks, and other scrap discharged from agricultural production and processing activities. The scraps from industrial production and processing activities including wood chips, sawdust, rags, leather chips, footwear, coal slag, fly ash, sludge, waste sludge and other scrap discharged from industrial production and processing activities. Naturally scraps include water hyacinth, lotus, water lily, and other aquatic plants;

ii) Collecting, classifying and cleaning plastic waste, then dry to a moisture percentage below 14% and grinding to obtain plastic powders. Wherein, the plastic waste used is all types of waste produced from different types of plastic including: Polyethylene Terephthalate (plastic number 1), High Density Polyethylene (plastic number 2), Polyvinyl Chloride (plastic number 3), Low Density Polyethylene (plastic number 4), Polypropylene (plastic number), Polystyrene (plastic number 6), and other resins (plastic number 7);

iii) Mixing plastic powder, scrap powder, additives and catalyst together by using mixing equipment at a predetermined rotation speed and rotation time from the controller; preferably rotation speed from 50 rpm to 100 rpm for a period of between 5 minutes to 20 minutes to obtain mixture of materials. Wherein, mixing plastic powder scrap powder, additives and catalyst in percentage respectively: 10% up to 80% plastic powder, 10% to 80% scrap powder, 1% to 20% additives, and 1% to 20% catalysts; of which, the total % by weight of the plastic powder, scrap powder, additives and catalysts is 100% of the mixture of materials and the unit is kilograms (kg). Wherein, plastic powders used in the mixture of materials include one or combination of plastic powders; scrap powders used in the mixture of materials include one or combination of scrap powders; additives used in the mixture include Polyacrylamide, Polyethylene Oxide, recoloring agent BWD_01, Maleic anhydride, Silane GF31, pigment, stearic acid, Zinc Stearate, flame retardant, foaming agents and other substances and other additives used in the production of building materials; wherein, additives used in the mixture of materials include one or combination of additives; catalysts include Polyetheramine, Compatibilizer, Butanox and other catalysts used in the production of building materials; wherein, catalyst used in the mixture of materials include one or combination of catalysts;

iv) Compressing the mixture of materials with a pelletizing equipment to create a plurality of composite pellets of sizes from 3 mm to 10 mm;

v) Drying the plurality of composite pellets with a drying equipment at predefined temperature, time and rotation speed of the controller; preferably from 80° C. to 150° C. with the rotation speed of the equipment between 30 rpm to 50 rpm;

vi) Heating the plurality of composite pellet of step v) by hot stir equipment at a temperature between 100° C. and 400° C., and rotation speed of equipment is between 5 rpm to 20 rpm;

vii) Shaping the plurality of composite pellets of step vi) by shaping equipment to obtain synthetic building materials;

viii) Inspecting the synthetic building materials of step vii); if the synthetic building materials is damaged, or defective, then follow step ix); otherwise follow step x);

ix) Treating damaged or defective product synthetic building materials comprises:

(a) Grinding damaged or defective synthetic building materials to obtain building material powder; damaged or defective synthetic building materials to obtain building material powder;

(b) Mixing the building material powder with the mixture of materials at step iii) to obtain a new mixture of materials; wherein the percentage calculated by the weight of the mixture is 50% to 80% of the mixture of materials at step iii) with 20% to 50% of the building material powder;

(c) Adding repeat compressing new mixture of materials at step iv);

x) Packaging synthetic building materials and storing.

The other purpose of the invention is to create a system of production of synthetic building materials with hot stir equipment which turns blades heating up from 100° C. to 400° C. in a short time. It helps to process many different primary and/or recycled plastics at the same time to form a mixture of composites used for many different types of products.

The other purpose of the invention is to create a system of production of synthetic building materials with drying equipment and hot stir equipment connected together to form a hot air circulation, helping to save energy and limiting emissions to the environment.

The other purpose of the invention is to create a system of semi-automatic synthetic building materials production equipment, limiting the use of manual labor, reducing production costs.

The other purpose of the invention is to create synthetic building materials products that replace traditional building materials, limiting exploitation of natural resources, reducing costs compared to traditional products.

The other purpose of the invention is to create a synthetic building materials products that utilizes plastic waste and scraps generated from manufacturing and processing activities of agriculture, industry and available in nature, helping to increase economic value, contributing to solving the problem of environmental pollution.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 2A is a three-dimensional perspective view (3D) that illustrates hot stir equipment;

FIG. 2B is a three-dimensional perspective view (3D) that illustrates the internal structure of the shaft viewed in the direction of the shaft output;

FIG. 2C is a three-dimensional perspective view (3D) that illustrates the internal structure of the shaft viewed in the direction of the shaft input;

DETAILED DESCRIPTION OF THE INVENTION

References will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
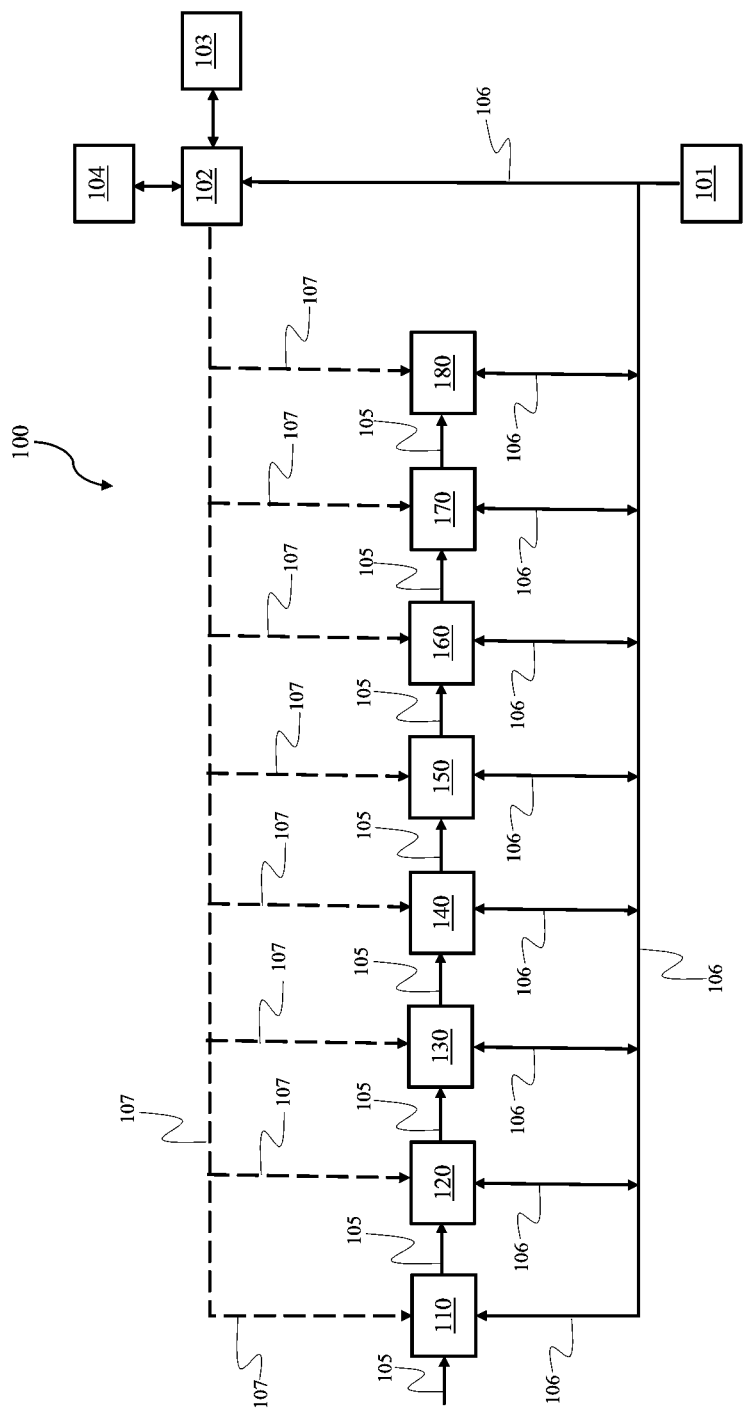
FIG. 1 provides a system of equipment for making synthetic building materials using plastic wastes combined with industrial and agricultural scrap.

One embodiment of the invention is now described with referring to FIG. 1, the system of equipment for making synthetic building materials using plastic wastes combined with industrial and agricultural scrap 100 ("system 100") according to the model's exemplary plan. System 100 consists of sorting and cleaning equipment 110, grinding equipment 120, powder grinding equipment 130, mixing equipment 140, pelletizing equipment 150, drying equipment 160, hot stir equipment 170, shaped equipment 180, all connected by mechanical connector 105. In an alternative invention, the system 100 also includes power source 101, controller 102, database 103 and screen 104. Power source 101 is used to supply power for controller 102, sorting and cleaning equipment 110, grinding equipment 120, powder grinding equipment 130, mixing equipment 140, pelletizing equipment 150, drying equipment 160, hot stir equipment 170, shaping equipment 180, operates through electrical connections 106. Controller 102 is used to control the operation of the sorting and cleaning equipment 110, grinding equipment 120, powder grinding equipment 130, mixing equipment 140, pelletizing equipment 150, drying equipment 160, hot stir equipment 170, shaping equipment 180 through transmission channel 107. Database 103 is configured to settings of operating parameters of system 100. Screen 104 shows the operation parameters of system 100 during creating synthetic building materials.

Each equipment in the system 100 is based on settings for different parameters such as temperature, time, etc., depends on the type of material used. These parameters are pre-researched and saved in database 103. When the system 100 works, the specific settings of each device stored in database 103 will be loaded into the controller 102, then controller 102 will control the operation of system 100.

As shown in FIG. 1, the controller 102 acts as the brain of the system 100. In some exemplary embodiment of the invention, controller 102 is a –16 or –32 bit, Programmable Logic Controller (PLC), a Supervisory Control and Data Acquisition (SCADA), or any other type of programmable logic array (PLA) consisting of a memory chip and integrated circuits for control logic, monitoring, and communicating. The controller 102 directs the programmable logic controller (PLC) and/or to execute control instructions, communicate with other units, carry out logic and arithmetic operations, and perform internal diagnostics. The controller 102 runs memory routines, constantly checking the PLC to avoid programming errors and ensure the memory is undamaged. Memory provides permanent storage to the operating system for database 103 used by controller unit 102. Five programming languages are used in controller 102 and PLC. They are defined by the international standard IEC 61131. Ladder logic is one of the most commonly used PLC languages. Another programming language is function block diagram (FBD). It describes functions between input and output variables. The function, represented by blocks, connects input and output variables. FBD is useful in depicting algorithms and logic from interconnected controls systems. Structured Text (ST) is a high-level language that uses sentence commands. In ST, programmers can use "if/then/else," "SQRT," or "repeat/until" statements to create programs. Instruction list (IL) is a low-level language with functions and variables defined by a simple list. Program control is done by jump instructions and sub-routines with optional parameters. Sequential Function Chart (SFC) language is a method of programming complex control systems. It uses basic building blocks that run their own sub-routines. Program files are written in other programming languages. SFC divides large and complicated programming tasks into smaller and more manageable tasks.

In another alternative of the present invention, the controller 102 is an 8 bit or 16 bit programmed microcontroller. The microcontroller is integrated with many units including a central processing unit (CPU), ROM or Flash program memory, RAM data memory, counter, timer, and I/O ports. I/O ports are connected to sorting and cleaning equipment 110, grinding equipment 120, powder grinding equipment 130, mixing equipment 140, pelletizing equipment 150, drying equipment 160, hot stir equipment 170 and shaping equipment 180. The programming languages that are widely used in microcontrollers are C and Assembly languages, etc.

As shown in FIG. 1, the sorting and cleaning equipment 110 is used to classify plastic waste or scraps after being collected to the factory, treated and cleaned, then materials are delivered to the grinding equipment 120 via a mechanical connector 105. Here, the raw material is crushed to a predetermined size and followed by mechanical connector 105 to the powder grinding equipment 130 to obtain raw powder. The raw powders are transferred to the mixing equipment 140 by the mechanical connector 105. Here, the raw powders are mixed in a specified ratio to disperse evenly and increase the adhesion of the material. The mixture after mixing is transported to the pelletizing equipment 150 by mechanical connector 105, where it will be compressed to make a composite. Next, the composite pellet is transferred to drying equipment 160 to heat and reduce moisture, then it is transported to the hot stir equipment 170 by mechanical connector 105 to thermosetting composites, then transported to the shaping equipment 180 to create the desired construction material. According to the various embodiments of the invention, different types of shaping equipment 180 can be used depending on the type of building materials required.

According to an embodiment of the invention, the drying equipment 160 and hot stir equipment 170 are also connected to create a hot air circulation cycle between two equipment by mechanical connector 105. Specifically, hot air after being used in drying equipment 160 to heat the composite, it will be taken to the hot stir equipment 170 to plasticize the composite. After that, the hot air from the hot stirring equipment 170 is returned to the drying equipment 160 to heat up the new pellets and continue the cycle.

According to some aspects of the invention, sorting and cleaning equipment 110, grinding equipment 120, powder grinding equipment 130, mixing equipment 140, pelletizing equipment 150, drying equipment 160, shaping equipment 180 are devices commonly used in many different fields so they will not be described in detail here so as not to obscure other aspects of the invention.

In the embodiment of the invention, the transmission channel 107 are wireless transmission channels such as Wi-fi, Bluetooth, BLE, RF, optical, Zigbee, Z-wave, etc. In some embodiments, transmission channel 107 maybe data transmission cables such as RS-232, RSJ-45, RS-485, etc.

In the various embodiments of the present invention, the mechanical connector 105 are conveyors of different shapes or hollow inner ducts that facilitate materials conveying.

Referring to FIG. 2A, a three-dimensional perspective (3D) that illustrates hot stir equipment 170 according to the exemplary embodiment of the invention. The hot stir equipment 170 includes a cylindrical rotating shaft 220, with one end mechanically connected to the material input 210, the other end mechanically connected to the material output 230. Material input 210 is responsible for putting materials and hot air into the shaft 220. The shaft 220 is the place to heat the material. Material output 230 is used to bring materials and hot air after being heated outside the shaft 220.

The material input 210 includes a feed hopper 211 and hot air input 212. The feed hopper 211 placed in contact with the shaft 220 to feed the input material to the shaft 220. The hot air input 212 in contact with the shaft 220 to provide hot air for the shaft 220 to carry out the heating process.

The Material output 230 including a steam vent 231, a hot air output 232 and a material receiver 233. The steam vent 231 is placed in contact with the shaft 220 to bring moisture separated from the material into the environment. The hot air output 232 is placed in contact with the shaft 220 to bring hot air after heating the material out of the shaft 220. Material receiver 233 is to collect materials after being heated inside the shaft 220.

The shaft 220 has a shaft input 223 is mechanically connected to the material input 210 and a shaft output 224 is mechanically connected to the material output 230. Outside the length of the shaft 220 is a large number of power-assisted rollers 221 and pinion wheels 222. The pinion wheels 222 receive transmission to rotate the shaft 220.

Referring to FIG. 2B, a three-dimensional perspective view (3D) illustrates the internal structure of the shaft 220 viewed in the direction of the shaft output 224 according to the exemplary embodiment of the invention. Inside the shaft 220, there are a plurality of mixing blades 226 in form of a rectangle D1 width from 300 mm to 500 mm, D2 length from 450 mm to 800 mm, one end bent at an angle of 15° to 20°. According to an embodiment of the present invention, the mixing blades 226 are attached equidistant from the inside circumference of the shaft 220 and running along the length of the shaft 220 with the bent end viewed in the same direction. The mixing blades 226 is used to distribute and stir evenly the ingredients, increasing the area of contact between the material and the drying agent.

Referring to FIG. 2C, a three-dimensional perspective view (3D) illustrates the internal structure of the shaft 220 viewed in the direction of the shaft input 223 according to the exemplary embodiment of the invention. Inside the shaft 220, on the side of the shaft input 223 fitted spiral groove 225 along the inner circumference of the shaft 220 and toward the mixing blades 226. The spiral groove 225 receives raw material from the material input 210 and takes the raw material to the mixing blades 226.

Figure 3:
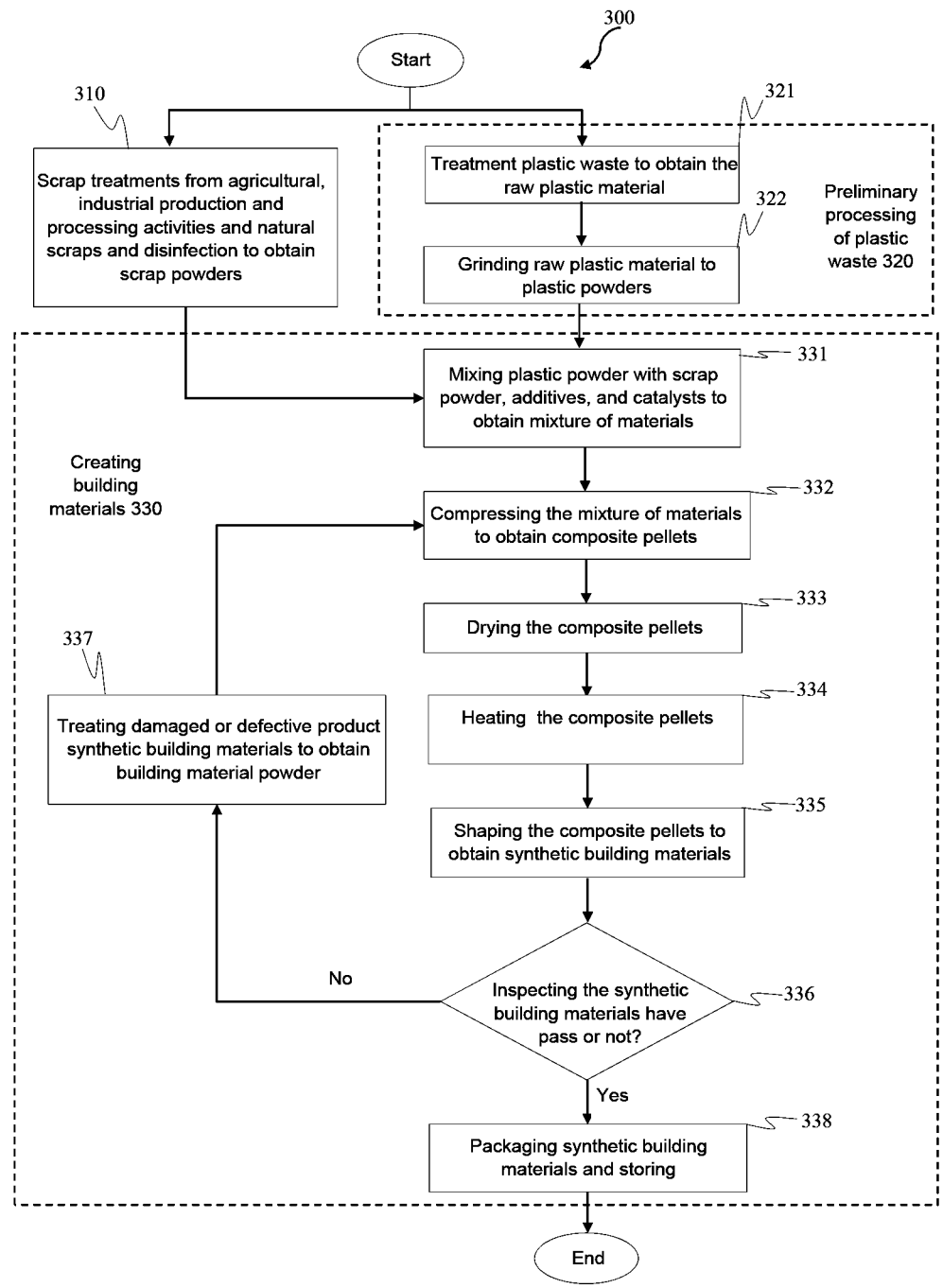
FIG. 3 is flowchart illustrating a method for making synthetic building materials using plastic wastes combined with industrial and agricultural scrap.

Referring to FIG. 3, a flowchart illustrating a method for making synthetic building materials using plastic wastes combined with agricultural and industrial scrap 300 ("method 300") implemented by the system 100 according to the exemplary embodiment of the invention.

The method 300 is carried out by 3 main steps including scrap treatment 310, preliminary processing of plastic waste 320 and creating building materials 330. The Scrap treatment 310 performs processing of scraps into predetermined moisture and dried powder from the controller 102. The processing of plastic waste 320 performs processing of plastic waste into predetermined moisture and dried plastic powder from the controller 102. Step 330 is to mix scrap powder, plastic powder, additives and catalysts in a defined ratio combined with compression to make composite pellets, then drying and heating the composite pellets to cast mold, inspect and pack products.

The method 300 begins with scrap treatment 310. Other types of scrap that are collected will undergo different sorting and treatment stages depending on the type of scrap used as: screening, separating impurities, centrifugal pressing, mincing, deodorizing, detoxifying, microbiological treatment, drying, etc. For large-sized scraps, it will undergo other grinding processes made by a grinding equipment 120 and a powder grinding equipment 130 to obtain scrap in powder form. According to exemplary embodiment of the invention, the types of scrap includes the types of waste generated from manufacturing and processing activities of agriculture and industry. Wherein, scraps from agricultural production and processing activities including corn cobs, corn stalks, coffee pods, cashew shells, bagasse, rice husks, banana stalks, plants and sunflower seeds, coconut trees, coconut shells, dragon fruit trees, rice stalks, barley stalks, and other scrap discharged from agricultural production and processing activities. Scraps from industrial production and processing activities including wood chips, sawdust, rags, leather chips, footwear, coal slag, fly ash, sludge, waste sludge and other scrap discharged from industrial production and processing activities.

According to an alternative embodiment of the invention, other types of natural scraps can also be used to produce construction materials, including water hyacinth, lotus, water lily, and other aquatic plants.

Depending on the nature and size of the type of scrap used, the treatment process is different, so that the resulting product has the right moisture and size, and is free of toxins and microorganisms. After the scrap treatment step 310, obtain scrap powders of moisture have been pre-determined from the controller 102, preferably less than 14% can be used immediately for step 331 or vacuum packaging to store in place dry. However, the storage time of scrap powder is not more than 3 months to avoid affecting the quality.

Following the step 310, the preliminary processing step of plastic waste 320 is carried out including the step of handling plastic waste 321 and the raw material grinding step 322.

In step 321, plastic waste is collected for treatment. According to the embodiment of the invention, the plastic waste used is all types of waste produced from different types of plastic including: Polyethylene Terephthalate (plastic number 1), High Density Polyethylene (plastic number 2), Polyvinyl Chloride (plastic number 3), Low Density Polyethylene (plastic number 4), Polypropylene (plastic number), Polystyrene (plastic number 6), and Other resins (plastic number 7). It should be noted that the symbolic codes of these resins are given by the American Scientific Council.

In step 321, all kinds of plastic waste collected from households, industrial zones, hospitals, landfills . . . are mainly plastic bags, plastic bottles, plastic straws, plastic cups, medicine bottles . . . are classified, cleaned to remove impurities, processed with microorganisms and harmful chemicals and then dried. After step 321 obtained the raw plastic material with predetermined moisture from controller 102, preferably below 14%.

In step 322, grinding raw plastic material. Raw plastic material is fed into crushers to reduce size by applying mechanical force. The grinding process through two stages is coarse grinding and pulverized. The coarse grinding stage is performed by grinding equipment 120 which reduces the size of the raw plastic. Next, raw plastic materials will be pulverized by powder grinding equipment 130.

In step 322, raw plastic materials produced from different types of plastic are ground together to form a plastic powder. The result obtained from step 322 is a plastic powder material which can be used immediately for step 331 or vacuum packaging to store in a dry place, but the storage time of plastic powders is not more than 6 months to not affect quality.

After preparing the scrap and plastic powder material in step 310 and step 320, the next step is creation of building material 330. The creating building materials 330 includes mixing plastic powder, scrap powder, additives and catalyst 331; compressing the mixture of materials 332; drying composite pellets 333; heating composite pellets 334; shaping composite pellets to create products synthetic building materials 335; inspecting synthetic building materials 336; treating damaged or defective product synthetic building materials 337 and packing 338.

In step 331, the plastic powder, scrap powder and catalyst, additive is added to the mixing equipment 140 to distribute the materials evenly, forming a mixture of materials. On the other hand, in the mixing process, there will be collisions and interactions between raw materials that changes the physical and chemical properties of the mixture of materials. Depending on the type of required building material, the composition and mixing ratio of the materials are different. According to a priority embodiment of the invention, the percentage (%) by weight to mixing the mixture of materials including plastic powder, scrap powder, additives and catalysts respectively: 10% up to 80% plastic powder, 10% to 80% scrap powder, 1% to 20% additives, 1% to 20% catalysts; of which, the total % by weight of the plastic powder, scrap powder, additives and catalysts is 100% of the mixture of materials and the unit is kilograms (kg); mixing time from 5 minutes to 20 minutes with the speed of rotation from 50 rpm to 100 rpm, the weight of the material mixture per batch depending on productivity and equipment working mode, so that the materials are mixed evenly.

According to an exemplary embodiment of the invention, the plastic powders used in the mixture of materials include one or combination of plastic powders to mixing in step 331 depending on the type of building material to be produced, so that the total weight of the plastic powder is the percentage ratio (%) of the weight of the plastic powder used for mixing in the mixture of materials.

According to an exemplary embodiment of the invention, the scrap powders used in the mixture of materials include one or combination of scrap powders to mixing in step 331 depending on the type of building material to be produced, so that the total weight of the scrap powder is the percentage ratio (%) of the weight of the scrap powder used for mixing in the mixture of materials.

In step 331, additives for purpose of coloring, foaming, anti-mold, anti-oxidation, lubrication, emulsification, fire retardant, anti-UV, etc, for building materials; in which the additives used include: Polyacrylamide, Polyethylene oxide, color reduction agent BWD_01, Meleic anhydride, Silan GF31, pigment, Stearic acid, Zinc stearate, Flame retardant, foaming agent and other additives used in the manufacture of building materials. According to the embodiments of the present invention, additives used in the mixture of materials include one or combination of additives, so that the total weight of the additive is the percentage ratio (%) of the weight of the additive used for mixing in the mixture of materials.

In step 331, catalysts are used to help accelerate the hardening process, improve compatibility, increase the mechanical properties of the building materials; in which the catalysts used include: Polyetheramin, Compatibilizer, Butanox and other catalysts used in the manufacture of building materials. According to the embodiments of the invention, catalyst used in the mixture of materials include one or combination of catalysts, so that the total weight of the catalyst is the percentage ratio (%) of the weight of the catalyst used for mixing in the mixture of materials.

After step 331, a mixture of materials with evenly dispersed materials is obtained, increasing the adhesion of the materials.

In step 332, the mixture of materials obtained in step 331 is put into the pelletizing equipment 150 creating a plurality of composite pellet of sizes from 3 mm to 10 mm, the weight of the material mixture per batch depending on productivity and equipment working mode.

In step 333, the composite pellets is fed into the drying equipment 160 to heating and reduce humidity, in which the drying temperature, time and rotation speed are predetermined from the controller 102. According to a preferred embodiment of the invention, the drying preferably temperature from 80° C. to 150° C. in X minutes, the drying equipment 160 rotation continuously at the speed of 30 rpm to 50 rpm to make the composite pellets stir continuously and heat evenly; the weight of composite pellets fed to the drying equipment 160 depending on the capacity and the working mode of the equipment. X is the predefined time period from the controller 102 and X is the real number greater than zero.

In step 334, heating the plurality of composite pellet according to step 333 by a hot stir equipment 170 with pre-determined heating temperature, time and rotation speed from the controller 102. According to a preferred embodiment of the invention, the heating preferably temperature from 100° C. to 400° C. for X minutes, the hot stir equipment 170 rotation continuously at the speed of 5 rpm to 20 rpm to make the composite pellet stir continuously and evenly heated; the weight of composite pellets fed to the hot stir equipment 170 depending on the capacity and the working mode of the equipment, however it is important to ensure that all the composite pellets are fully heated and reach a hot state. X is the predefined time period from the controller 102 and X is the real number greater than zero.

In step 335, shaping the plurality of composite pellets of step 334 by shaping equipment 180 to obtain synthetic building materials. Depending on the type of shaping equipment used, to obtain different shapes and sizes, for example: industrial boards, industrial construction wood, bricks, tiles, roofing panels, partitions, panels, pallets, asphalt, etc and other building materials.

In step 336, inspecting the synthetic building materials of step 335; if the synthetic building materials is damaged, or defective, then follow step 337; otherwise follow step 338.

In step 337, treating damaged or defective product synthetic building materials comprises:

a) Damaged or defective synthetic building materials is grinding with a grinding equipment 120 and a powder grinding equipment 130 to obtain building material powder.

b) Mixing the building material powder with the mixture of materials at step 331 to obtain a new mixture of materials; wherein the percentage calculated by the weight of the mixture is 50% to 80% of the mixture of materials at step 331 with 20% to 50% of the building material powder.

c) adding repeat compressing new mixture of materials at step 332.

At the end of step 338, the synthetic building materials products are packed and storing.

According to an exemplary embodiment of the invention, in addition to the system 100 listed in the brief description of the drawings and the detailed description of the invention, method 300 is used to create bricks from plastic waste materials, corn cobs, and rice husks include the following steps:

a) Scrap treatment: scrap used are corn cobs and rice husk, cleaned with sorting and cleaning equipment 110 and drying to 13% moisture. Then, grinding with grinding equipment 120 and powder grinding equipment 130, to obtain corn cobs powder and rice husk powder;

b) Preliminary processing of plastic waste: plastic waste collected from households, industrial zones, hospitals, landfills, are mainly plastic bags, plastic bottles, plastic straws, plastic cups, medicine bottles, etc, are passed through the sorting and cleaning equipment 110 and drying to 13% moisture, to obtain raw plastic materials;

c) The raw plastic materials are grinding with grinding equipment 120 and powder grinding equipment 130, to obtain plastic powder;

d) Mixing plastic powder, corn cobs powder, rice husks powder, additives and catalyst together by using mixing equipment 140. In which 45 kg plastic powder, 25 kg rice husks powder, 27 kg corn cobs powder, 1.5 kg additives and 1.5 kg catalyst are used. Then, mixing for 15 minutes with rotation speed from 70 rpm, to obtain mixture of materials;

e) Compressing the mixture of materials with a pelletizing equipment 150 to create a plurality of composite pellets of sizes from 3 mm to 10 mm;

f) The composite pellets are fed into the drying equipment 160 to heating and reduce humidity, in which the drying temperature to 110° C. with rotation speed from 40 rpm;

g) Heating the composite pellet according by hot stir equipment 170 at a temperature between 200° C., and rotation speed of equipment is between 8 rpm;

h) Shaping the composite pellets by shaping equipment 180, to obtain 82 bricks, each brick has a weight from 0.8 kg to 1.5 kg;

i) Inspecting the quality of 82 bricks. All are qualified;

j) Packaging 82 bricks and storing.

Implementations of system 100 and method 300 disclosed above achieve the following objectives:

Taking the scraps of plastic waste and scrap from production activities of agriculture, industry, and human domestic waste, waste available in nature, contribute to reducing the environmental pollution.

Take scraps of agricultural and industrial residues also contributes to increase the value of agricultural and industrial production and processing activities.

The costs of these new building materials are lower than those of traditional building materials currently on the market.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS

100 The system of equipment for making synthetic building materials using plastic wastes combined with industrial and agricultural scrap
101 Power source
102 Controller
103 Database
104 Screen
105 Mechanical connector
106 Electrical connections
107 Transmission channel
110 Sorting and cleaning equipment
120 Grinding equipment
130 Powder grinding equipment
140 Mixing equipment
150 Pelletizing equipment
160 Drying equipment
170 Hot stir equipment
180 Shaping equipment
210 Material input
211 Feed hopper
212 Hot air input
220 Shaft
221 Power-assisted rollers
222 Pinion wheels
223 Shaft input
224 Shaft output
225 Spiral groove
226 Mixing blade
230 Material output
231 Steam vent
232 Hot air output
233 Material Receiver

What is claimed is:

1. A method for making synthetic building materials using plastic wastes combined with industrial and agricultural scrap including the following steps:

i) scrap treatment: scraps from agricultural, industrial production and processing activities and natural scraps are collected, sorted and processed, to obtain scrap powders;

ii) collecting, classifying, and cleaning plastic waste, then drying and grinding to obtain plastic powders;

iii) mixing plastic powder, scrap powder, additives and catalyst together by using mixing equipment at a predetermined rotation speed and rotation time from a controller; preferably rotation speed from 50 rpm to 100 rpm for a period of between 5 minutes to 20 minutes to obtain a mixture of materials;

wherein plastic powders used in the mixture of materials include one or combination of plastic powders;

wherein scrap powders used in the mixture of materials include one or combination of scrap powders;

wherein additives used in the mixture include Polyacrylamide, Polyethylene Oxide, recoloring agent BWD_01, Maleic anhydride, Silane GF31, pigment, stearic acid, Zinc Stearate, flame retardant, foaming agents and other substances and other additives used in the production of building materials; wherein, additives used in the mixture of materials include one or combination of additives; wherein the catalysts include Polyetheramine, compatibilizers, Butanox and other catalysts used in the production of building materials; wherein, catalyst used in the mixture of materials include one or combination of catalysts;

iv) compressing the mixture of materials with a pelletizing equipment to create a plurality of composite pellets of sizes from 3 mm to 10 mm;

v) drying the plurality of composite pellets with a drying equipment at predefined temperature, time and rotation speed of the controller; preferably from 80° C. to 150° C. with the rotation speed of the equipment between 30 rpm to 50 rpm;

vi) heating the plurality of composite pellet of step v) by a hot stir equipment at a temperature from 100° C. to 400° C., and rotation speed of equipment is between 5 rpm to 20 rpm;

wherein the hot stir equipment is also including a material input, a material output and a shaft; the material input including a feed hopper and a hot air input placed in contact with the shaft; the material output including a steam vent, a hot air output and a material receiver placed in contact with the shaft; the shaft having a spiral groove and mixing blades are disposed on the inner diameter of the shaft; the spiral groove installed at the input of the shaft, running along the inner circumference of the shaft and facing the mixing blades; each of the mixing blades is rectangular in shape from 450 mm to 800 mm in length, 300 mm to 500 mm in width and one end bent at an angle of 15° to 20° and attached equidistant from the inside circumference of the shaft and distributed along the length of the shaft from the position in contact with spiral groove to the shaft output;

vii) shaping the plurality of composite pellets of step vi) by shaping equipment to obtain synthetic building materials;

viii) inspecting the synthetic building materials of step vii); if the synthetic building materials is damaged, or defective, then follow step ix); otherwise follow step x);

ix) treating damaged or defective product synthetic building materials comprises:
  (a) grinding damaged or defective synthetic building materials to obtain building material powder;
  (b) mixing the building material powder with the mixture of materials at step iii) to obtain a new mixture of materials;
  (c) repeat step iv) by compressing the new mixture of materials;

x) packaging synthetic building materials and storing.

* * * * *